US012660828B2

(12) United States Patent
De Simone

(10) Patent No.: US 12,660,828 B2
(45) Date of Patent: Jun. 23, 2026

(54) FROZEN CONFECTION SHAPED BAKERY ITEM COMPOSITIONS

(71) Applicant: Magnum ICC US, LLC, Wilmington, DE (US)

(72) Inventor: Antonio De Simone, Bedford (GB)

(73) Assignee: MAGNUM ICC US, LLC, Wilmington, DE (US)

( * ) Notice: Subject to any disclaimer, the term of this patent is extended or adjusted under 35 U.S.C. 154(b) by 423 days.

(21) Appl. No.: 17/428,496

(22) PCT Filed: Feb. 6, 2020

(86) PCT No.: PCT/EP2020/053012
§ 371 (c)(1),
(2) Date: Aug. 4, 2021

(87) PCT Pub. No.: WO2020/161251
PCT Pub. Date: Aug. 13, 2020

(65) Prior Publication Data
US 2022/0104507 A1 Apr. 7, 2022

(30) Foreign Application Priority Data
Feb. 6, 2019 (EP) .................................... 19155769

(51) Int. Cl.
| | |
|---|---|
| *A21D 13/33* | (2017.01) |
| *A21D 2/16* | (2006.01) |
| *A21D 2/18* | (2006.01) |
| *A21D 2/36* | (2006.01) |
| *A21D 13/11* | (2017.01) |

(52) U.S. Cl.
CPC ............. *A21D 13/33* (2017.01); *A21D 2/165* (2013.01); *A21D 2/181* (2013.01); *A21D 2/364* (2013.01); *A21D 13/11* (2017.01)

(58) Field of Classification Search
CPC .......... A21D 13/11; A21D 8/02; A21D 2/364; A21D 13/33
See application file for complete search history.

(56) References Cited

U.S. PATENT DOCUMENTS

| | | | |
|---|---|---|---|
| 5,306,513 A | 4/1994 | Colucci et al. | |
| 6,391,366 B1 | 5/2002 | Boldon | |
| 6,824,799 B1* | 11/2004 | Huang ................... | A21D 13/33 426/138 |
| 12,396,553 B2 | 8/2025 | Diks-warmerdam et al. | |
| 12,507,710 B2 | 12/2025 | Chamberlain et al. | |
| 12,532,897 B2 | 1/2026 | Ansari et al. | |
| 2008/0113069 A1* | 5/2008 | Green ................... | A21D 2/364 426/106 |
| 2008/0248169 A1* | 10/2008 | Amend ................ | A21C 15/025 426/138 |
| 2011/0151065 A1 | 6/2011 | Bartkowska et al. | |
| 2018/0177212 A1 | 6/2018 | Byrne et al. | |
| 2022/0061351 A1 | 3/2022 | Domburg et al. | |
| 2023/0102904 A1 | 3/2023 | Chamberlain et al. | |
| 2024/0415144 A1 | 12/2024 | Nandi et al. | |
| 2025/0040567 A1 | 2/2025 | Ansari et al. | |
| 2025/0049066 A1 | 2/2025 | Ansari et al. | |
| 2025/0212909 A1 | 7/2025 | Frith et al. | |
| 2025/0212910 A1 | 7/2025 | Frith et al. | |

FOREIGN PATENT DOCUMENTS

| | | |
|---|---|---|
| CN | 103999910 | 3/2016 |
| JP | 402308750 | 12/1990 |

OTHER PUBLICATIONS

Waffelhornchen: So konnen Sie Eiswaffeln selber machen; Waffelhornchen; Apr. 27, 2015; pp. 1-3. No translation available, XP055568233; www.t-online.de.
Hippen, Eiswaffeln, Gluckskekse von Einbeck 1968 Ein Thermomix Rezept aus der Kategorie Backen sub auf; Hippen Eiswaffeln Gluckskekse von Einbeck; Oct. 15, 2016; pp. 1-5; No translation available; XP055568756; www.rezeptwelt.de.
Knusprige Waffelhornchen oder Waffelschalen—Rezept—kochbar. de; Knusprige Waffelhornchen oder Waffelschalen; Sep. 15, 2017; pp. 1-2; No translation available; XP055568761.; web.archive.org.
Chocolate & Caramel Flavoured Ice Cream Cones; Chocolate & Caramel Flavoured Ice Cream Cones; Nov. 2, 2018; pp. 1-4; XP055568635; Mintel, www.gnpd.com.
Oreo Ice Cream Dessert Cone; Oreo Ice Cream Dessert Cone; Nov. 12, 2018; pp. 1-4; XP055568628.; Mintel. www.gnpd.com.
Salted Caramel Ice Cream Sandwich; Salted Caramel Ice Cream Sandwich; Jan. 3, 2019; pp. 1-5; XP055568734; Mintel. www.gnpd. com.
Search Report and Written Opinion in EP19155769; Mar. 22, 2019.
Written Opinion in PCTEP2020053012; Feb. 10, 2021.
Search Report and Written Opinion in PCTEP2020053012; Mar. 23, 2020.
Vanilla Flavoured Sugar; Mintel (Online); Jul. 17, 2006; .; GNPD Database.
Carola Enning; Kuchenlexikon Deutschland; Hausfrauenseite.de; Mar. 12, 2020; www.Hausfrauenseite.de.
IPRP2 in PCTEP2020053012; Apr. 19, 2021.

* cited by examiner

*Primary Examiner* — Jenna A Watts
(74) *Attorney, Agent, or Firm* — PABST PATENT GROUP LLP

(57) ABSTRACT

A frozen confection shaped bakery item dough composition comprising: from 10.0 wt % to 30.0 wt % water; from 5.0 wt % to 35.0 wt % sugar; from 4.0 wt % to 25.0 wt % fat; and, from 35.0 wt % to 60.0 wt % flour. A frozen confection shaped bakery item prepared from the frozen confection shaped bakery item dough composition and a process for its preparation.

7 Claims, No Drawings

FROZEN CONFECTION SHAPED BAKERY ITEM COMPOSITIONS

FIELD OF THE INVENTION

A frozen confection shaped bakery item dough composition comprising: from 10.0 wt % to 30.0 wt % water; from 5.0 wt % to 35.0 wt % sugar; from 4.0 wt % to 25.0 wt % fat; and, from 35.0 wt % to 60.0 wt % flour. A frozen confection shaped bakery item prepared from the frozen confection shaped bakery item dough composition and a process for its preparation.

BACKGROUND OF THE INVENTION

Frozen confection rolled wafer cones are typically prepared from a batter with a composition of: 40 wt % flour; 17 wt % sugars; 37 wt % water; 5.0 wt % oil; 1.0 wt % lecithin and 0.1 wt % salt, 'The Science of Ice Cream' C. Clarke RSC, 2004, page 59. Batters are typically free-flowing compositions with a liquid-like consistency that can be dosed onto a baking plate by flowing the batter through a nozzle. Once baked, the resultant wafers are moulded into shapes when hot and then cooled to harden, resulting in a brittle and crunchy frozen confection rolled wafer cone. When the wafer cones are to be used together with frozen confection, the cones require a moisture-resistant coating on the inside of the cone to prevent water migrating from the frozen confection into the cone during storage. If the moisture-resistant coating is not used, the cones are soggy, rather than crunchy consumed. Additionally, is it not possible to use a batter comprising inclusions in such a method as the batter surrounding the inclusions shrinks causing holes in the wafer sheet during baking resulting in a poor-quality wafer sheet.

Alternative composition consistencies have been described, such as 'roll dough' compositions or 'drop-cookie' compositions. U.S. Pat. No. 5,306,513 A discloses the formation of edible cones, more particularly cookie cones, from a 'roll dough' composition. When baked, the edible cones have the texture, appearance, and consistency of a cookie. In order to obtain the desired consistency when baked, the dough requires from about 0.5 wt % to 2.5 wt % of water-binding agent, such as proteins, plant extracts and modified starches, in order to be able to retain from 3.0 wt % to about 10.0 wt % water in the baked composition. The disclosed doughs are rolled by hand, cut to shape, formed and refrigerated before baking; or, rolled by hand, refrigerated, then cut to shape before baking. U.S. Pat. No. 5,306,513 A is silent with regard to cone texture on storage, compositions comprising inclusions and the use of the doughs with automated industrial equipment such as shaping apparatus.

The present invention provides a frozen confection shaped bakery item dough composition comprising from 10.0 wt % to 30.0 wt % water; from 5.0 wt % to 35.0 wt % sugar; from 4.0 wt % to 25.0 wt % fat; and, from 35.0 wt % to 60.0 wt % flour. The dough is suitable for use with industrial apparatus such as baking plates and shaping apparatus, such as rolling mandrels, allowing industrial scale processing and efficiency of production lines. The dough is also suitable to comprise up to 25 wt % inclusions based on the weight of the dough composition. High quality, reproducible, moisture-migration resistant novel texture cones are obtainable through use of the novel shaped bakery item dough composition.

SUMMARY OF THE INVENTION

A frozen confection shaped bakery item dough composition comprising: from 10.0 wt % to 30.0 wt % water; from 5.0 wt % to 35.0 wt % sugar; from 4.0 wt % to 25.0 wt % fat; and, from 35.0 wt % to 60.0 wt % flour. A frozen confection shaped bakery item prepared from the frozen confection shaped bakery item dough composition and a process for its preparation.

DETAILED DESCRIPTION OF THE INVENTION

In an aspect of the invention, the invention is directed towards a frozen confection shaped bakery item dough composition comprising from 10.0 to 30.0 wt % water; from 5.0 wt % to 35.0 wt % sugar; from 4.0 wt % to 25.0 wt % fat; and, from 35.0 wt % to 60.0 wt % flour.

Dough means a shaped bakery item composition for use in the preparation of a frozen confection shaped bakery item, such as a receptacle or decorative frozen confection wafer-shaped item. Dough may also be known as a sweet paste. Typically, dough is a malleable composition that is dosed onto a baking plate by scooping or an extrude and cut process such as the process disclosed in 'The technology of wafers and waffles I, Operational Aspects'; Karl F. Tiefenbacher, Elsevier 2017, page 659.

Shaped means that the bakery item composition has been manipulated into a form, typically after baking and before cooling. Shaping includes rolling, moulding, flattening or cutting the baked dough composition to form a receptacle such as a cone or cup, or a decorative item typically seen for frozen confection wafer-shapes such as fan, flute, disc or rectangular shape. 'The technology of wafers and waffles I, Operational Aspects'; Karl F. Tiefenbacher, Elsevier 2017, page 499, 506-507, and 512-520.

Typical wafer cone batter compositions comprise water, flour, sugars, fat, emulsifier and salt as described in 'The Science of Ice Cream' C. Clarke RSC, 2004, page 59. Exemplary flours, sugars and fats are described in 'The technology of wafers and waffles I, Operational Aspects'; Karl F. Tiefenbacher, Elsevier 2017, pages 78-81, 125-127, and 183.

Water may originate from water added to the composition or from ingredients such as sugar syrups or aqueous solutions of colouring and flavouring.

In an embodiment of the invention, water is present in the frozen confection dough composition in an amount of from 10.0 wt % to 30.0 wt %; from 15.0 wt % to 28.0 wt %; from 16.0 wt % to 25.0 wt % of the weight of the dough composition.

Sugars may be present in any degree of purity; e.g.: 'sucrose' includes 'brown sugar'. Prior to use, sugars may be present in any physical form such as crystalline, powder or syrup. Sugar means the total sugar content of the frozen confection composition. Sugar is selected from the group consisting of mono-saccharides, di-saccharides, oligosaccharides, and mixtures thereof. Mono- and di-saccharides are selected from the group consisting of glucose, fructose, lactose, galactose, maltose, sucrose and mixtures thereof. Preferably the sugar comprises sucrose. More preferably the sugar is sucrose.

The frozen confection composition may also comprise sweeteners selected from the group consisting of Rebaudioside A [also known as *Stevia* (Cargill Inc)]; sucralose; acesulfame potassium (Nutrinova); sugar alcohols and mixtures thereof. Sugar alcohols include erythritol, sorbitol, xylitol, mannitol, lactitol or mixtures thereof. The frozen confection composition may also comprise soluble gluco-fibre ingredients such as Promitor (Tate & Lyle).

In an embodiment of the invention, sugar is present in an amount of from 5.0 wt % to 35.0 wt %; from 7.0 wt % to 32.0 wt %; %; from 10.0 wt % to 30.0 wt %; from 15.0 wt % to 25.0 wt % of the weight of the dough composition.

Flour means a granulated edible powder prepared from, for example, wheat, barley, oats, rye, spelt, bran, rice and corn. Flour is selected from the group consisting of wheat flour, barley, corn flour, starch, rice and mixtures thereof. Starch may originate from, for example: corn, potato, rice and tapioca as disclosed in 'The technology of wafers and waffles I, Operational Aspects'; Karl F. Tiefenbacher, Elsevier 2017, page 78-81. Preferably the flour comprises wheat or a blend of corn flour and corn or potato starch. Preferably the flour is wheat.

In an embodiment of the invention, flour is present in an amount of from 35 wt % to 60 wt %; from 37 wt % to 57 wt %; from 39 wt % to 52 wt %; from 40 wt % to 48 wt % of the weight of the dough composition.

Fat may be dairy or vegetable fat or oil and is selected from the group consisting of soya bean oil, cottonseed oil, peanut oil, safflower oil, corn oil, canola oil, coconut oil, palm oil, palm kernel oil, hydrogenated oils, butter oil, cream, peanut butter, butter and mixtures thereof.

In an embodiment of the invention, fat is present in an amount of from 4.0 wt % to 25.0 wt %; from 5.0 wt % to 20.0 wt %; from 6.0 wt % to 18.0 wt % of the weight of the dough composition.

In an embodiment of the invention the frozen confection shaped bakery item dough composition comprises inclusions in an amount of from 0 wt % to 25.0 wt %; from 5.0 wt % to 20.0 wt %; from 7.0 wt % to 15.0 wt % in relation to the weight of the dough composition.

In a further embodiment of the invention the frozen confection shaped bakery item dough composition comprises a ratio of fat to flour weight ratio of from 0.1:1 to 0.6:1 and a sugar to flour weight ratio of from 0.1:1 to 0.8:1.

In a further embodiment of the invention the frozen confection shaped bakery item dough composition comprises a ratio of fat to flour weight ratio of from 0.1:1 to 0.45:1 and a sugar to flour weight ratio of from 0.1:1 to 0.7:1.

In a further embodiment of the invention the frozen confection shaped bakery item dough composition comprises a ratio of fat to flour weight ratio of from 0.2:1 to 0.45:1 and a sugar to flour weight ratio of from 0.1:1 to 0.7:1.

In a further embodiment of the invention the frozen confection shaped bakery item dough composition comprises from 15.0 to 30.0 wt % water; from 5.0 wt % to 35.0 wt % sugar; from 4.0 wt % to 18.0 wt % fat; and, from 35.0 wt % to 60.0 wt % flour, with the proviso that the weight percentage fat to flour ratio is not from 0.0:1 to 0.2:1 and the weight percentage sugar to flour ratio is not from 0.0:1 to 0.35:1.

In a further embodiment of the invention the frozen confection shaped bakery item dough composition comprises from 15.0 to 30.0 wt % water; from 5.0 wt % to 25.0 wt % sugar; from 4.0 wt % to 25.0 wt % fat; and, from 35.0 wt % to 60.0 wt % flour, wherein the composition comprises a ratio of weight percent fat to flour of from 0.21:1 to 0.6:1 and sugar to flour of from 0.2:1 to 0.35:1, or a ratio of weight percent fat to flour of from 0.01:1 to 0.49:1 and sugar to flour of from 0.36:1 to 0.54:1, or a ratio of weight percent fat to flour of from 0.01:1 to 0.49:1 and sugar to flour of from 0.54:1 to 0.7:1.

In a further embodiment of the invention the frozen confection shaped bakery item dough composition comprises inclusions in an amount of up to 25.0 wt %; from 1.0 wt % to 25.0 wt %; from 5.0 wt % to 20.0 wt %; from 7.0 wt % to 15.0 wt % based on the weight of the frozen confection shaped bakery item dough composition. When calculating the composition of the frozen confection shaped bakery item dough composition that further comprises inclusions, the wt % of the ingredients of the inclusions are independent of the wt % of the ingredients of the composition of the frozen confection shaped bakery item dough composition. For example, a frozen confection shaped bakery item dough composition may comprise in total 25 wt % inclusions and 75 wt % of a composition comprising from 10.0 wt % to 30.0 wt % water; from 5.0 wt % to 35.0 wt % sugar; from 4.0 wt % to 25.0 wt % fat; and, from 35.0 wt % to 60.0 wt % flour.

In a further embodiment of the invention the frozen confection shaped bakery item dough composition does not comprise an emulsifier. The frozen confection shaped bakery item dough composition does not comprise an ingredient providing the function of an emulsifier. Emulsifiers may include one or more ingredients selected from the group consisting of: egg yolk; mono-glycerides; di-glycerides; lecithin and mixtures thereof. Preferably, the frozen confection shaped bakery item dough composition does not comprise egg yolk, lecithin or a mixture thereof.

Frozen confection shaped bakery item dough compositions may further comprise inclusions that are typically found in frozen confections and frozen confection products. Such inclusions include for example, fruit pieces, chocolate pieces, confectionary, nuts and bakery goods (wafer, biscuit and cake pieces), as described in 'The Science of Ice Cream', C. Clarke, RSC 2004, page 54-59. Inclusions are selected from the group consisting of: nuts, seed, confectionary pieces, oats and mixtures thereof. Nuts are selected from the group consisting of peanuts, salted or unsalted, hazelnuts, almonds, pistachio and mixtures thereof. Confectionary pieces are selected from the group consisting of cocoa nibs, chocolate pieces and mixtures thereof. The longest length of the inclusions is from 1.0 mm to 25.0 mm; from 3.0 mm to 20.0 mm; from 5.0 mm to 15.0 mm.

In a further embodiment of the invention the frozen confection shaped bakery item dough composition may comprise colours and flavours as described in 'The technology of wafers and waffles I, Operational Aspects'; Karl F. Tiefenbacher, Elsevier 2017, page 523. Such colours include cocoa powder and food colouring. It is possible that two or more dough compositions of difference colour, flavour or both difference colour and flavour and are baked together to form a shaped bakery item. A frozen confection shaped bakery item comprising two or more colours, two or more flavours or two or more colours and two or more flavours.

In a further aspect of the invention, the invention relates to a frozen confection shaped bakery item prepared from a frozen confection shaped receptacle dough composition; wherein the frozen confection shaped bakery item composition comprises sugar in an amount of from 7.1 wt % to 41.1 wt %; fat in an amount of from 5.7 wt % to 29.4 wt %; and, flour in an amount of from 50.0 wt % to 70.6 wt %.

In an embodiment of the invention the frozen confection shaped bakery item, sugar is present in an amount of from 7.1 wt % to 41.1 wt %; from 10.0 wt % to 37.6 wt %; %;

5 from 14.3 wt % to 35.3 wt %; from 21.4 wt % to 29.4 wt % of the weight of the bakery item.

In an embodiment of the invention the frozen confection shaped bakery item, fat is present in an amount of from 5.7 wt % to 29.4 wt %; from 7.1 wt % to 23.5 wt %; from 8.6 wt % to 21.1 wt % of the weight of the bakery item.

In an embodiment of the invention the frozen confection shaped bakery item, flour is present in an amount of from 50.0 wt % to 70.6 wt %; from 52.9 wt % to 67.1 wt %; from 55.7 wt % to 61.2 wt % of the weight of the bakery item.

The frozen confection shaped bakery item typically has a thickness of from 1.0 mm to 5.0 mm, from 2.0 mm to 4.0 mm. The frozen confection shaped bakery item typically has a density of from 0.50 g cm$^{-3}$ to 1.5 g cm$^{-3}$; from 0.75 g cm$^{-3}$ to 1.25 g cm$^{-3}$; from 0.90 g cm$^{-3}$ to 1.1 g cm$^{-3}$.

In a further aspect of the invention, the invention relates to a frozen confection product comprising a frozen confection shaped bakery item and one or more frozen confections. Frozen confection means a sweet-tasting fabricated foodstuff intended for consumption in the frozen state (i.e. under conditions wherein the temperature of the foodstuff is less than 0° C.). The frozen confection is selected from the group consisting of water ice, milk-ice, ice cream, frozen yoghurt, frozen custard, sorbet, gelato and mixtures thereof. Ice cream may be selected from the group consisting of dairy ice cream, non-dairy ice cream and mixtures thereof. Preferably the frozen confection comprises ice cream, frozen yoghurt or mixtures thereof. Preferably the frozen confection is aerated. The frozen confection may be prepared, for example, according to methods provided in the 'The Science of Ice Cream', C. Clarke, RSC 2004, chapters 3, 4 and 8; and 'Ice Cream' 5$^{th}$ Ed., Marshall and Arbuckle, 1996, Chapman & Hall, New York. N.Y., in particular chapters 11, 12 and 22.

In a further aspect of the invention, the invention is directed towards a frozen confection product comprising a frozen confection shaped bakery item prepared from and one or more frozen confections and a frozen confection shaped bakery item dough composition comprising from 10.0 wt % to 30.0 wt % water; from 5.0 wt % to 35.0 wt % sugar; from 4.0 wt % to 25.0 wt % fat; and, from 35.0 wt % to 60.0 wt % flour. In an embodiment of the invention, the frozen confection product does not comprise of a moisture-migration agent such as a fat-based compound, chocolate or chocolate analogue that is positioned on all or part of the inner wall of the bakery item and is positioned between the bakery item and frozen confection.

In a further aspect of the invention, the invention relates to a process for the preparation of a frozen confection shaped bakery item comprising the steps of:
a. Mixing the frozen confection shaped bakery item dough composition ingredients;
b. Baking the product of step a.; and,

c. Shaping the product of step b.

Mixing step a. comprises combining the dry ingredients including sugar, fat and flour with water to form a frozen confection shaped bakery item dough composition.

Baking step b. comprises the steps of:
b1: heating a (lower and upper) baking plate of a baking apparatus, such as the apparatus disclosed in 'The technology of wafers and waffles I, Operational Aspects'; Karl F. Tiefenbacher, Elsevier 2017, page 499;
b2: dosing the frozen confection shaped bakery item dough composition of step a. onto the lower plate of the baking apparatus; and,
b3: closing the upper plate of the baking apparatus to enclose the dough composition between the lower and upper plates of the baking apparatus.

The lower and upper plates are typically heated to a temperature of between 150° C. and 250° C.; preferably between 190° C. and 220° C.

Once the frozen confection shaped bakery item dough composition of step a. has been dosed onto the lower plate of the baking apparatus, the upper plate is closed, and the frozen confection shaped bakery item dough composition is baked for from 50 seconds to 120 seconds; preferably from 55 seconds to 80 seconds.

After baking the baked frozen confection shaped bakery item dough composition is removed from the baking plates and shaped prior to cooling.

Once shaped, the baked frozen confection shaped bakery item dough composition is allowed to cool to room temperature. Once cooled to room temperature the baked frozen confection shaped bakery item dough composition has a crunchy texture and is a frozen confection shaped bakery item. The frozen confection shaped bakery item, if shaping has resulted in a receptacle shape may be filled with one or more frozen confections to form a frozen confection product.

EXAMPLES

Example 1: Preparation of Frozen Confection Shaped Bakery Item from Frozen Confection Shaped Bakery Item Dough Composition The frozen confection shaped bakery item dough composition ingredients are mixed to form a homogenous dough. The homogenous dough (25 g) is dosed onto a baking plate at 220° C. and prepared according to the process provided in 'The technology of wafers and waffles I, Operational Aspects'; Karl F. Tiefenbacher, Elsevier 2017, page 499.

TABLE 1

| | | | | | Frozen Confection Shaped bakery item Dough Compositions of Example 1. | | | | | | | | |
|---|---|---|---|---|---|---|---|---|---|---|---|---|---|
| | A | B | C | D | E | F | G | H | I | J | K | L | M |
| Water | 21.0 | 22.1 | 20.0 | 20.1 | 21.8 | 23.5 | 19.2 | 22.6 | 19.3 | 21.1 | 20.8 | 19.2 | 23.0 |
| Fat | 13.4 | 10.0 | 16.2 | 9.1 | 17.7 | 5.6 | 4.6 | 21.8 | 18.6 | 5.0 | 20.1 | 12.3 | 14.7 |
| Skimmed Milk Powder | 0.4 | 0.3 | 0.5 | 0.3 | 0.5 | 0.2 | 0.1 | 0.6 | 0.5 | 0.1 | 0.6 | 0.4 | 0.4 |
| Sucrose | 19.9 | 17.4 | 22.3 | 24.9 | 15.4 | 14.0 | 29.8 | 10.9 | 24.1 | 22.7 | 18.0 | 26.7 | 12.3 |
| Flour | 44.8 | 49.8 | 40.6 | 45.3 | 44.1 | 56.1 | 45.8 | 43.6 | 37.1 | 50.5 | 40.1 | 41.0 | 49.1 |
| Salt | 0.4 | 0.5 | 0.4 | 0.5 | 0.4 | 0.6 | 0.5 | 0.4 | 0.4 | 0.5 | 0.4 | 0.4 | 0.5 |
| Fat:Flour | 0.30 | 0.20 | 0.40 | 0.20 | 0.40 | 0.10 | 0.10 | 0.50 | 0.50 | 0.10 | 0.50 | 0.30 | 0.30 |
| Sugar:Flour | 0.44 | 0.35 | 0.55 | 0.55 | 0.35 | 0.25 | 0.65 | 0.25 | 0.65 | 0.45 | 0.45 | 0.65 | 0.25 |

TABLE 1-continued

Frozen Confection Shaped bakery item Dough Compositions of Example 1.

| | A | B | C | D | E | F | G | H | I | J | K | L | M |
|---|---|---|---|---|---|---|---|---|---|---|---|---|---|
| Forming and Shaping Score | 3 | 1 | 2 | 3 | 3 | 2 | 2 | 2 | 1 | 2 | 1 | 2 | 2 |

TABLE 2

Frozen Confection Shaped bakery item Dough Compositions of Example 1 Comprising Inclusions.

| | O | P | Q | R |
|---|---|---|---|---|
| Water | 16.9 | 16.9 | 16.9 | 17.1 |
| Fat | 10.7 | 10.7 | 10.7 | 10.8 |
| Sucrose | 20.1 | 20.1 | 20.1 | 20.1 |
| Flour | 42.8 | 42.8 | 42.8 | 42.9 |
| Salt | 0.4 | 0.4 | 0.4 | — |
| Cocoa Nibs | 9.1 | — | — | — |
| Peanuts | — | 9.1 | — | 9.1 |
| Hazelnuts | — | — | — | — |
| Almonds | — | — | 9.1 | — |
| Fat:Flour | 0.25 | 0.25 | 0.25 | 0.25 |
| Sugar:Flour | 0.47 | 0.47 | 0.47 | 0.47 |
| Forming and Shaping Score | 3 | 3 | 3 | 3 |

Forming and Shaping Score Key:

| Score Description | Score |
|---|---|
| Sheet forming is possible but shaping (rolling) is not possible | 1 |
| Sheet forming is possible and suitable for shaping (rolling) | 2 |
| Sheet forming is possible and suitable for industrial shaping processes; high quality cones are formed | 3 |

Examples I and K demonstrate that dough compositions with a fat:flour ratio of 0.50 and a sugar:flour ratio of greater than 0.45 or 0.65 are capable of forming a sheet during baking; but are susceptible to crumbling or breaking when the sheet is removed from the baking plate and shaped.

Similarly, Example B demonstrates that a dough composition with a fat:flour ratio of 0.20 and a sugar:flour ratio of 0.35 are also capable of forming a sheet during baking; but are susceptible to crumbling or breaking when the sheet is removed from the baking plate and shaped.

Dough compositions with scores of 2 are suitable for shaping; however, the dough is not suitable for industrial shaping processes that use automated removal techniques that provide ridge and groove forms on the outside of the frozen confection cone.

Example 2: Shelf Life of Frozen Confection Shaped Bakery Item (Example 1A)

The initial weight of standard wafer cones prepared from a batter with the composition according to 'The Science of Ice Cream' by C. Clarke, page 59, and Example 1 A, were measured. The cones were filled with ice cream (without any barrier between the cone and ice cream), and stored at −18° C. Every three days a standard cone and a cookie cone were taken from the freezer, carefully emptied of the ice cream, and weighed again. The increase in weight of the cone after storage was calculated.

TABLE 2

Water Absorption of Frozen Confection Wafer Cones with Storage Duration.

| time, hours | Weight of standard wafer wafer cone (g) | Difference in weight of standard wafer cone (g) compared to t = 0 | Difference in weight of standard wafer cone (wt %) compared to standard wafer cone at t = 0 | Weight of Example 1A (g) | Difference in weight of Example 1A (g) compared to Example 1A at t = 0 | Difference in weight of Example 1A (wt %) compared to Example 1A at t = 0 |
|---|---|---|---|---|---|---|
| 0 | 9.70 | N/A | 0 | 18.33 | N/A | 0 |
| 72 | 12.32 | 2.62 | 21.3% | 21.16 | 2.83 | 13.4% |
| 144 | 11.93 | 2.79 | 23.4% | 22.04 | 3.57 | 16.2% |
| 216 | 12.15 | 3.13 | 25.8% | 21.56 | 3.60 | 16.7% |
| 288 | 11.88 | 3.23 | 27.2% | 21.73 | 3.86 | 17.8% |
| 360 | 12.47 | 3.42 | 27.4% | 21.27 | 3.87 | 18.2% |

Example 2 demonstrates that frozen confection wafer cones prepared from frozen confection shaped bakery item dough compositions of Example 1 absorb less water during storage over 360 hours than frozen confection wafer cones prepared from standard wafer batter compositions. A lower rate and amount of water absorption results in a longer shelf life of the frozen confection shaped bakery item cone when coated with a moisture barrier coating in comparison to the standard wafer cone.

The invention claimed is:

1. A process for the preparation of a frozen confection shaped bakery item comprising the steps of:
   a. mixing a frozen confection shaped bakery item dough composition comprising:
      from 16.0 wt % to 25.0 wt % water;
      from 5.0 wt % to 35.0 wt % sugar;
      from 8.6 wt % to 25.0 wt % fat; and,
      from 40.0 wt % to 48.0 wt % flour,
      and wherein the composition comprises a ratio of weight percent fat to flour of from 0.2:1 to 0.45:1 and sugar to flour of from 0.1:1 to 0.7:1, and with the proviso that the composition does not comprise egg yolk, lecithin or mixtures thereof;

b. baking the dough composition of step a into a product; and, c. shaping the product of step b into the frozen confection shaped bakery item.

2. The process according to claim 1, wherein the composition comprises from 8.6 wt % to 18.0 wt % fat.

3. The process according to claim 1, wherein the dough composition comprises up to 25 wt % inclusions based on the weight of the frozen confection shaped bakery item dough composition.

4. The process according to claim 3, wherein the inclusions are selected from the group consisting of nuts, seeds, chocolate pieces, oats and mixtures thereof.

5. The process according to claim 3, wherein the longest length of the inclusions is from 1.0 mm to 25.0 mm.

6. The process according to claim 1, wherein the dough is two or more colours.

7. The process for the preparation of a frozen confection shaped bakery item according to claim 1, wherein the product of step c. is in the shape of a cone or cup.

\* \* \* \* \*